United States Patent
Aas et al.

(10) Patent No.: US 11,371,286 B2
(45) Date of Patent: Jun. 28, 2022

(54) TOP DRIVE, TRACTION MOTOR DE-COUPLING DEVICE

(71) Applicant: Schlumberger Technology Corporation, Sugar Land, TX (US)

(72) Inventors: Brynjulv Aas, Kristiansand (NO); Jonathan David Deagle, Cumberland (CA); Peter William Cave, Langley (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 249 days.

(21) Appl. No.: 15/676,510

(22) Filed: Aug. 14, 2017

(65) Prior Publication Data

US 2019/0048939 A1    Feb. 14, 2019

(51) Int. Cl.

| | |
|---|---|
| *F16D 1/116* | (2006.01) |
| *E21B 3/02* | (2006.01) |
| *E21B 19/06* | (2006.01) |
| *E21B 19/16* | (2006.01) |
| *E21B 3/04* | (2006.01) |
| *F16D 1/108* | (2006.01) |
| *F16D 1/10* | (2006.01) |

(52) U.S. Cl.
CPC ............... *E21B 3/022* (2020.05); *E21B 3/02* (2013.01); *E21B 3/04* (2013.01); *E21B 19/06* (2013.01); *E21B 19/16* (2013.01); *F16D 1/108* (2013.01); *F16D 1/116* (2013.01); *F16D 2001/103* (2013.01)

(58) Field of Classification Search
CPC ............. F16D 1/116; E21B 3/02; E21B 19/06
See application file for complete search history.

(56) References Cited

U.S. PATENT DOCUMENTS

| 4,421,179 A | 12/1983 | Boyadjieff |
|---|---|---|
| 4,570,706 A | 2/1986 | Pugnet |
| (Continued) | | |

FOREIGN PATENT DOCUMENTS

| CN | 101845937 A | 9/2010 |
|---|---|---|
| CN | 104389514 A | 3/2015 |

OTHER PUBLICATIONS

Office Action issued in Chinese Patent Application No. 201880059931.5 dated May 6, 2021; 14 pages (with English translation).

*Primary Examiner* — Robert E Fuller
*Assistant Examiner* — Theodore N Yao
(74) *Attorney, Agent, or Firm* — Kelly McKinney (57) ABSTRACT

A top drive for well operations having a gearbox, a traction motor connected to the gearbox so that a motor shaft of the traction motor extends into the gearbox, a quill extending into the gearbox, a gear train positioned within the gearbox and mechanically connected between the traction motor shaft and the quill, and a connector positioned in the gear train, wherein in a coupled configuration the connector communicates torque through the gear train, and wherein in a decoupled configuration the connector does not communicate torque through the gear train. A method for operating a top drive by applying a first torque to a quill with two traction motors, disconnecting one of the traction motors from the quill, and applying a second torque less than 50% of the first torque to the quill with the non-disconnected traction motor.

14 Claims, 7 Drawing Sheets

(56) References Cited

U.S. PATENT DOCUMENTS

| | | | |
|---|---|---|---|
| 5,107,940 A | | 4/1992 | Berry |
| 5,501,286 A | | 3/1996 | Berry |
| 6,007,268 A | * | 12/1999 | Whittington ....... A63B 21/0728 |
| | | | 403/110 |
| 6,860,337 B1 | | 3/2005 | Orr et al. |
| 6,913,096 B1 | | 7/2005 | Nielsen et al. |
| 7,270,189 B2 | | 9/2007 | Brown et al. |
| 7,451,826 B2 | | 11/2008 | Pietras |
| 7,461,830 B2 | | 12/2008 | Newman |
| 7,654,313 B2 | | 2/2010 | Angman |
| 7,743,853 B2 | | 6/2010 | Rudshaug et al. |
| 7,784,535 B2 | | 8/2010 | Wells et al. |
| 7,784,565 B2 | * | 8/2010 | Wells ..................... E21B 19/16 |
| | | | 175/24 |
| 7,828,085 B2 | | 11/2010 | Kuttel et al. |
| 8,499,858 B2 | | 8/2013 | Kuttel et al. |
| 8,839,884 B2 | | 9/2014 | Kuttel et al. |
| 9,464,491 B2 | | 10/2016 | Nikiforuk |
| 2009/0044982 A1 | | 2/2009 | Wells et al. |
| 2009/0084537 A1 | * | 4/2009 | Rudshaug ................. E21B 3/02 |
| | | | 166/77.51 |
| 2013/0299247 A1 | * | 11/2013 | Kuttel ..................... E21B 19/16 |
| | | | 175/170 |
| 2014/0131052 A1 | | 5/2014 | Richardson |
| 2016/0145954 A1 | | 5/2016 | Helms et al. |
| 2017/0159360 A1 | | 6/2017 | Netecke et al. |

\* cited by examiner

TOP DRIVE, TRACTION MOTOR DE-COUPLING DEVICE

TECHNICAL FIELD

The present disclosure relates generally to the field of drilling wells. More particularly, the invention relates to methods and apparatus for driving top drives in wellbore drilling systems.

BACKGROUND

Figure 1:
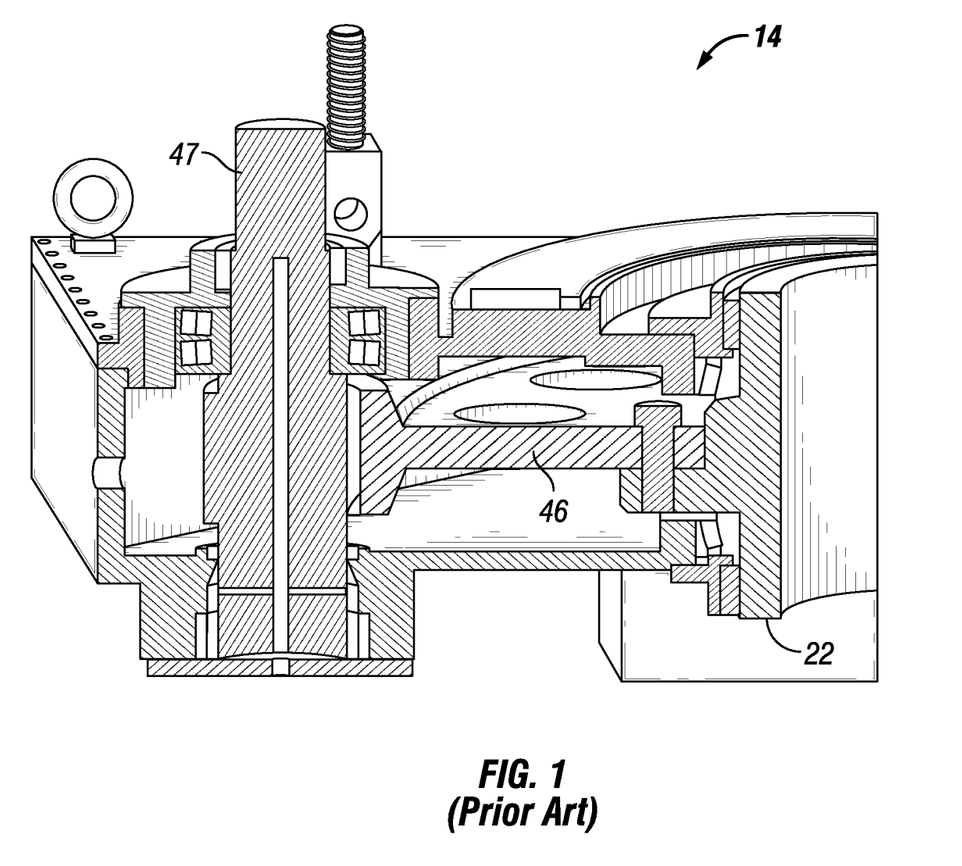
FIG. 1 illustrates a cross-sectional perspective view of a prior art top drive gearbox wherein a pinion is driven by a traction motor (not shown) to drive a bull gear and quill.

Typically, top drives comprise a gearbox with a quill extend from and below the gearbox. At least one traction motor is connected to the top of the gearbox. The output shaft of the traction motor is connected via a gear system to the quill. FIG. 1 illustrates a typical gearbox of a top drive system, wherein a bull gear 46 is driven by one or more pinions 47 and the pinions 47 are driven by one or more traction motors (not shown), respectively. The bull gear 46 turns the quill 22. An illustrative system is disclosed in U.S. Pat. No. 8,499,858, originally assigned to Canrig Drilling Technology Ltd.

Further, National Oilwell Varco has a traction motor de-coupling device on a top drive sold under the acronym TDX. This top drive includes a sliding fork that pulls a flexible coupling half away from the stationary coupling half. This design requires the decoupling and coupling to be submerged in oil so that the entire coupling system needs a separate oil-filled compartment—also known as the coupling housing. This system has a separate oil compartment that requires maintenance and oil change. There is also a risk for this oil to leak down to the main gearbox oil reservoir that again may lead to overheating.

SUMMARY

In accordance with the teachings of the present disclosure, disadvantages and problems associated with existing top drives are overcome by providing an ability to decouple the traction motors from the spindle.

An aspect of the invention provides a top drive for well operations, the top drive comprising: a gearbox; a traction motor connected to the gearbox so that a motor shaft of the traction motor extends into the gearbox; a quill extending into the gearbox; a gear train positioned within the gearbox and mechanically connected between the traction motor shaft and the quill; and a connector positioned in the gear train, wherein in a coupled configuration the connector communicates torque through the gear train, and wherein in a decoupled configuration the connector does not communicate torque through the gear train.

According to a further aspect of the invention, there is provided a top drive for well operations, the top dive comprising: a gearbox; a traction motor connected to the gearbox so that a motor shaft of the traction motor extends into the gearbox; a quill extending into the gearbox; and a pinion shaft assembly positioned in the gearbox for engagement with the motor shaft to transfer torque to the quill, wherein torque is transferred from the traction motor to the quill through the pinion shaft assembly when the pinion shaft assembly is engaged with the motor shaft, and wherein torque is not transferred from the traction motor to the quill through the pinion shaft assembly when the pinion shaft assembly is disengaged with the motor shaft.

Still another aspect of the invention provides a method for operating a top drive for well operations, the method comprising: applying a first torque to a quill with two traction motors; disconnecting one of the traction motors from the quill; and applying a second torque less than 50% of the first torque to the quill with the non-disconnected traction motor.

BRIEF DESCRIPTION OF THE DRAWINGS

A more complete understanding of the present embodiments may be acquired by referring to the following description taken in conjunction with the accompanying drawings, in which like reference numbers indicate like features.

DETAILED DESCRIPTION

Preferred embodiments are best understood by reference to FIGS. 2-7 below in view of the following general discussion. The present disclosure may be more easily understood in the context of a high level description of certain embodiments.

Figure 2:
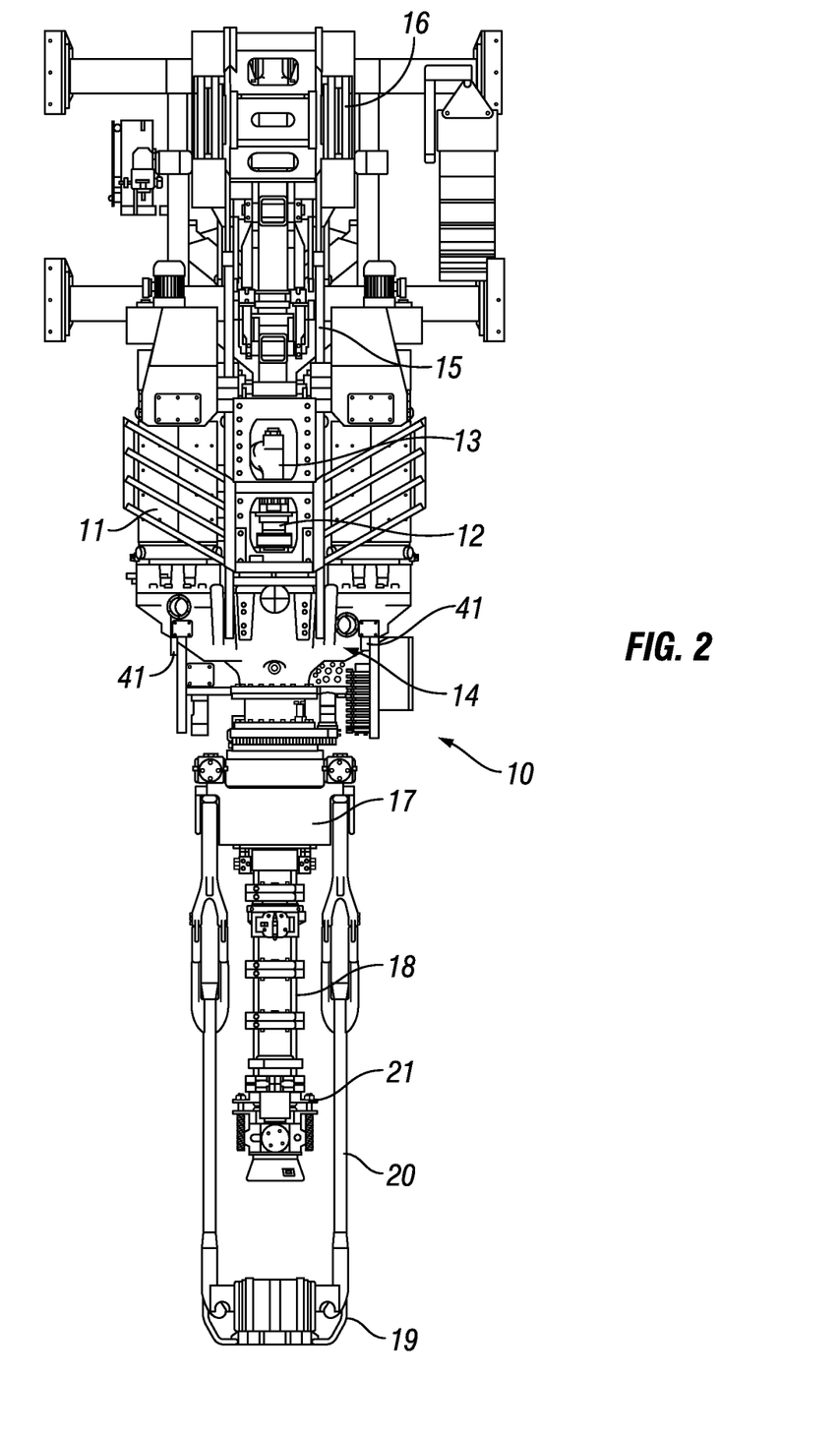
FIG. 2 is a side view of a top drive of the present invention, wherein two traction motors are attached to a gearbox and the gearbox provides access to pinion shaft assemblies to couple/decouple the traction motors.

FIG. 2 is a side view of a top dive embodiment of the present invention. The top drive 10 has a washpipe 12 positioned between two AC traction motors 11. The washpipe 12 has a wireline access 13 at its top. The traction motors 11 are connected to the top of a gearbox 14, and a drill stem 18 extends from the bottom of the gearbox 14. The gearbox 14 is suspended from a crown block 16 by four tie rods 15. A pipe handler 17 is connected to the bottom of the gearbox 14, wherein the pipe handler 17 has an elevator 19 suspended from elevator links 20 and a back-up clamp 21. The gearbox 14 has two covers 41 that provide access to pinion shaft assemblies to couple/decouple the traction motors 11.

Figure 3:
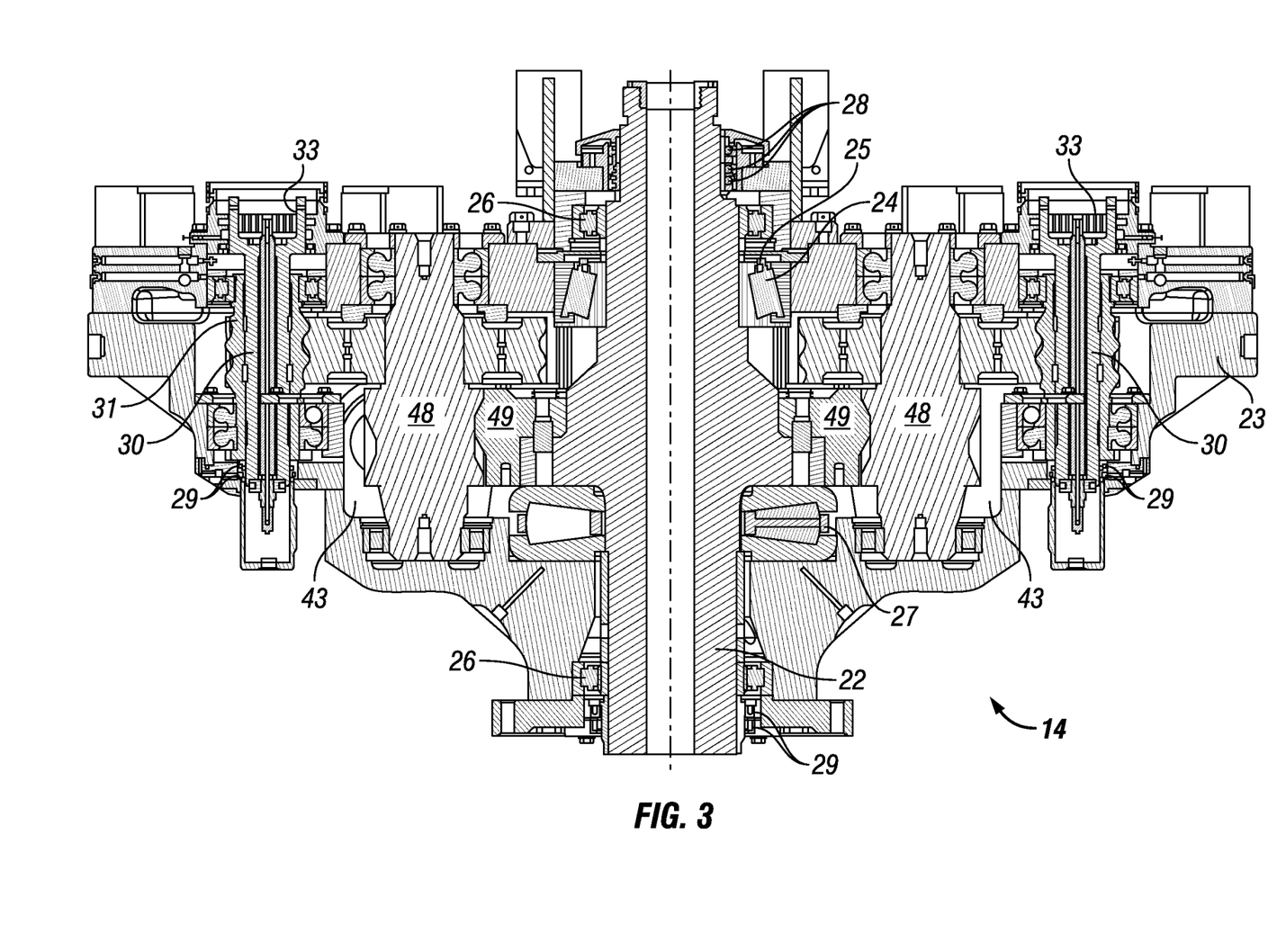
FIG. 3 is a cross-sectional side view of a top drive gearbox, wherein two pinion shaft assemblies are positioned to engage compound idle gears to drive a quill driven gear to apply torque to a quill, wherein all of the mechanical components are housed within the same gear oil compartment.

The main part of the top drive 10 is the gearbox 14. FIG. 3 is a cross-sectional view of the gearbox 14, which has a gearbox housing 23. One aspect of the invention provides each traction motor 11 with an output shaft design that is furnished with a spline end that mates with a driving pinion splined hub 34. The specially designed pinion shaft assemblies 30 are part of the top drive gearbox. The traction motors 11 have output drive shaft ends designed to mate with the driving pinion splined hub 34. According to one embodiment of the invention, each pinion shaft assembly 30 includes an inner pinion shaft 31 with internal spine coupling (sliding shaft) that allows a traction motor output shaft (not shown) to be fully physically disconnected and isolated from the internal spline hub 33. In case of a motor breakdown, the traction motor 11 can easily be mechanically isolated within a few minutes and thereby minimize a rig's drilling down time.

Full independence may be provided for each traction motor 11 in case one motor should fail, the other motor may continue top drive operations. With only one operational motor, the top drive may still provide 100% rpm at 50% drilling torque. Each motor may have an individual encoder, a separate VFD supply, and separate power lines from VFD to top drive. The AC traction motors may also be furnished with mechanical parking brakes. Each motor may be easily disconnected mechanically from the gearbox. Mechanical disconnection allows mechanical DE shaft isolation in case of motor bearing failure.

Returning to FIG. 3, the housing may be made of high strength cast steel. A quill 22 is mechanically engaged with the traction motors 11 through a series of gears. Each traction motor output shaft (not shown) is connected to gearbox 14 via a flexible coupling that has a quick disconnect feature via a pinion shaft assembly 30 that allows the traction motor to be manually disconnected from the quill 22 in the gearbox 14, wherein the flexible coupling will be described fully below. When coupled to its respective traction motor 11, each pinion shaft assembly 30 meshes with and drives a compound idle gear 48. Each compound idle gear 48 comprises a larger diameter pinion gear and a smaller diameter pinion gear, wherein the larger diameter pinion gears are meshed with and driven by the pinion shaft assemblies 30. A quill driven gear 49 is fastened to the circumference of the quill 22 and is meshed with and driven by the smaller diameter pinion gears of the compound idle gears 48. The pinion shaft assembly 30, the compound idle gear 48 and the quill driven gear 49 comprise a gear train between the traction motor 11 and the quill 22. All gearwheels may be helical cut type, carburized and ground. The shaft outputs of the pinion shaft assemblies 30 have dual lip seals to seal the gear oil in the gearbox 14.

FIG. 3 further illustrates how the quill 22 is supported in the gearbox housing 23 by a large robust axial bearing 24, wherein pretensioned springs 25 ensure endurance and reliability of the bearings. The pretensions spring 25 (50 kips) ensures optimal condition for the axial thrust bearings. Top and bottom radial bearings 26 are separate from the axial bearings 24. A thrust bearing 27 supports the quill 22 upwardly so that the significant weight of drill pipe and other equipment may be suspended from the quill 22 of the top drive. The tapered thrust bearing 27 may be heavy supported in order to minimize risk of bearing failure when subject to severe shock loads—ref jarring, top hole drilling, etc. The gearbox housing 23 is able to support high capacity via a rigid base for the thrust bearing 27. Triple lip seals 28 seal the top of the quill 22, wherein two of the seals seal the top of the gearbox housing 23 to the quill 22 and the third seal seals the oil reservoir. The seal of the reservoir prevents oil from leaking while the top drive is horizontal in a transport position, and the two seals prevent mud and water from entering the gearbox while the top drive is vertical in an operational position. Triple lip seals 28 are mounted in the top cover of the gearbox housing 23 in order to prevent spilled mud from entering the gearbox 14. An upper grease compartment between the triple lip seals 28 may have an inspection plug in the gearbox housing 23 to allow visual grease quality inspection, wherein the visual inspection allows for a warning prior to the gear oil being contaminated with mud and water. The lower end of the gearbox housing 23 is sealed by dual lip seals 29. Bearings and gearwheels may be partly submerged in gear oil, which provides sufficient splash oil while rotating below 100 rpms, as well as minimizes the risk of gearbox breakdown in case of forced circulation failure. The oil in the gearbox may be circulated and filtered continuously during operation. The gearbox may be equipped with an electrical driven circulation pump (not shown) providing circulation of the gear oil via a filter and oil cooler so as to ensure a perfect condition of the gears and bearings independent of the drilling and environment conditions.

As shown in FIG. 3, normally both the traction motors 11 will drive the quill 22 via the gears in the gearbox 14. The pinion shaft assembly 30 may be locked in a position to fully engage with shaft (not shown) of the traction motor 11. Motor torque is transferred from the output drive shaft ends of the traction motors 11 into internal spline hubs 33 of the pinion shaft assemblies 30. The pinion shaft assemblies 30 may have regular gear teeth that transfer torque through the gearbox gear wheels into the quill 22. The pinion shaft assemblies 30 may be supported by roller & ball bearings providing perfect alignment with the other gear wheels. There may be spigots at the motor shaft connection and tight tolerance for the pinion shaft assemblies 30.

Figure 4:
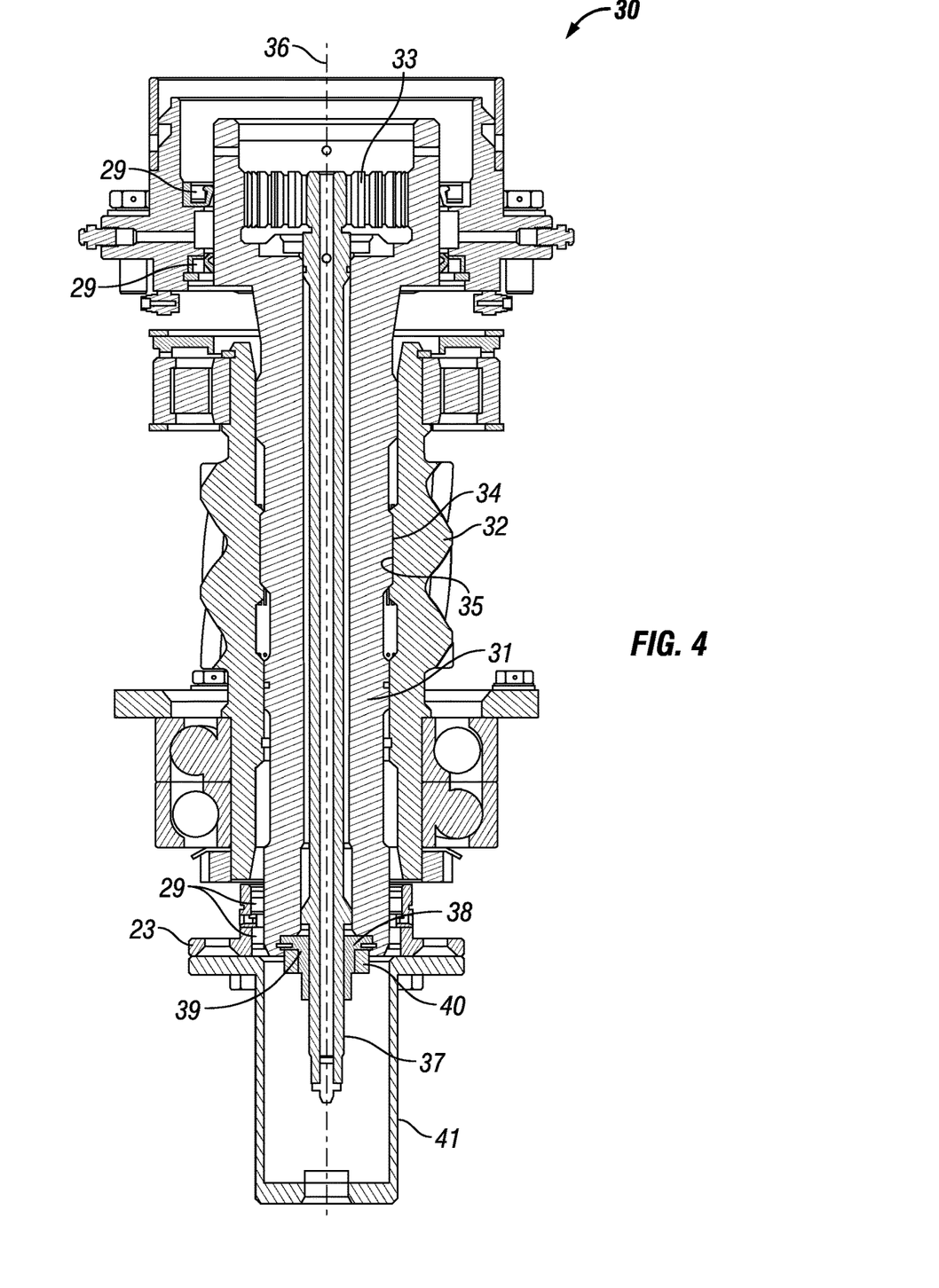
FIG. 4 is a cross-sectional side view of a pinion shaft assembly wherein an inner pinion shaft is in a coupled position.

Referring to FIG. 4, a cross-sectional side view of a pinion shaft assembly 30 is illustrated in a position for being coupled to an output shaft (not shown) of a traction motor 11. An inner pinion shaft 31 is positioned within an outer pinion shaft 32. The upper end of the inner pinion shaft 31 comprises an internal spline hub 33. The inner and outer pinion shafts 31 and 32 mate with each other via a spline coupling, wherein the inner pinion shaft 31 has radially outward projecting splines 34 and the outer pinion shaft 32 has radially inward projecting splines 35. The spines are ridges or teeth that run parallel to the longitudinal central axis 36 of the inner and outer pinion shafts 31 and 32. The inner and outer pinion shafts 31 and 32 are coupled together by a mating or meshing of the splines 34 and 35 so as to rotate around longitudinal central axis 36 as one shaft. However, while the splines 34 and 35 do not allow relative rotation movement between the inner and outer pinion shafts 31 and 32, the splines do allow relative translation movement along the longitudinal central axis 36. As explained more fully below, it is this relative translation movement along the longitudinal central axis 36 that allows the pinion shaft assemblies 30 to couple/decouple with the traction motors 11. A threaded stud 37 is positioned within the inner pinion shaft 31. A retainer nut 38 is threaded onto the lower end of the threaded stud 37. A snap ring 39 is snapped into an annular recess in the lower end of the inner pinion shaft 31 behind the retainer nut 38 to retain the retainer nut 38 in the inner pinion shaft 31. A locknut and washer 40 are mounted on the outside of the retainer nut 38. A cover 41 is attached to the bottom of the gearbox housing 23.

Figure 5:
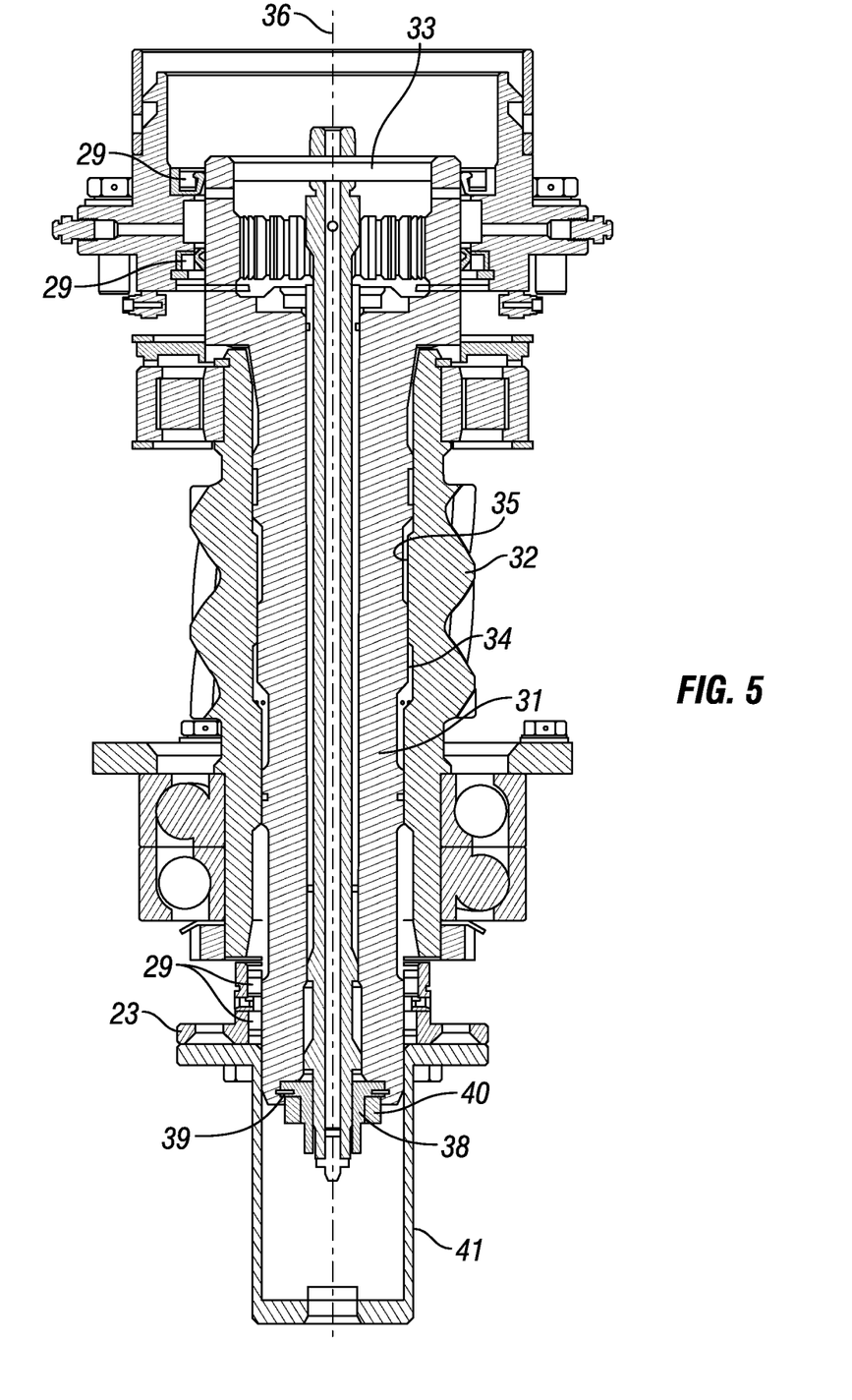
FIG. 5 is a cross-sectional side view of a pinion shaft assembly wherein an inner pinion shaft is in a decoupled position.
Figure 6:
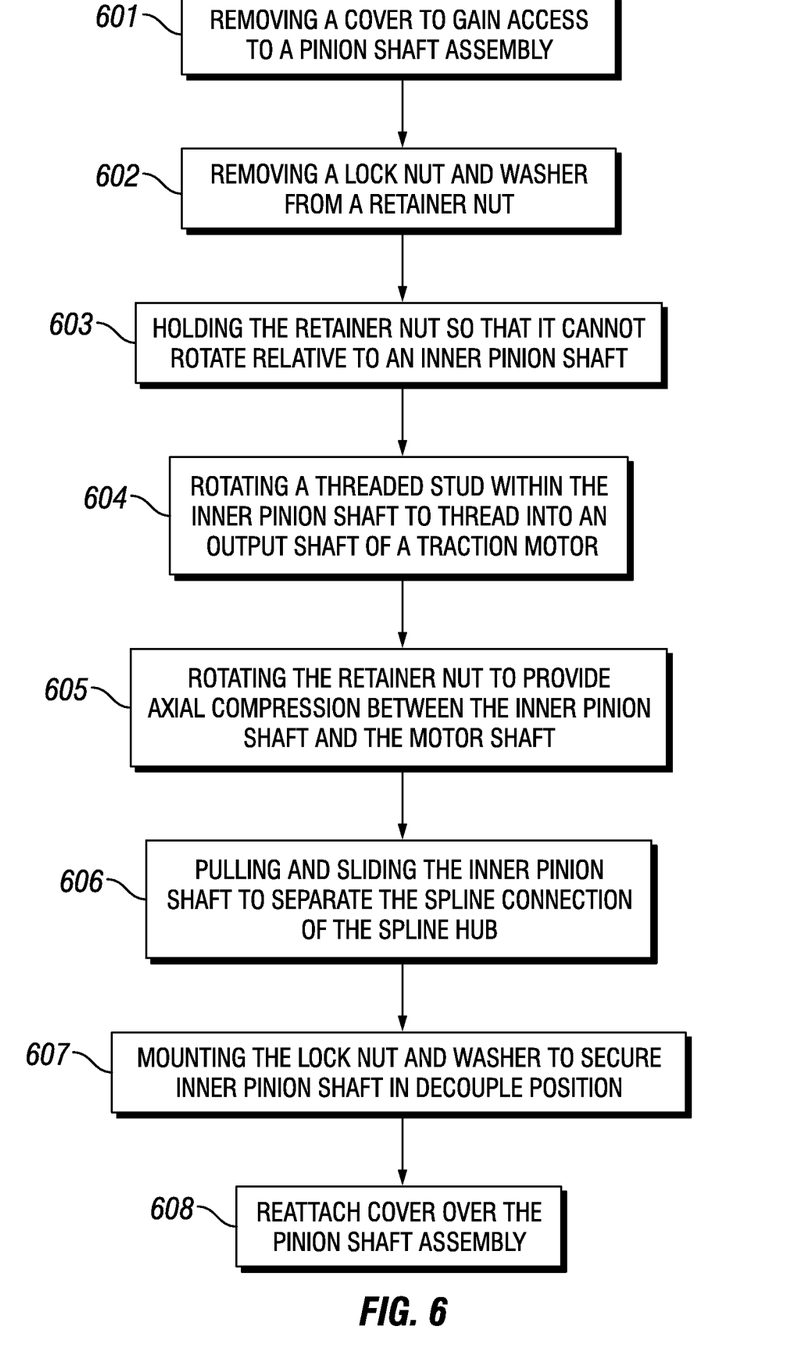
FIG. 6 is a flow chart illustrating a process for reconfiguring a pinion shaft assembly to decouple a traction motor from a quill in a top drive gearbox.

Referring to FIG. 5, a cross-sectional side view of a pinion shaft assembly 30 is illustrated in a position for being decoupled relative to an output shaft (not shown) of a traction motor 11. The inner pinion shaft 31 slides along the longitudinal axis 36 between the coupled position shown in FIG. 4 and the decoupled position shown in FIG. 5. When the inner pinion shaft 31 slides downwardly, the teeth of the internal spline hub 33 disengage from corresponding teeth of an output shaft (not shown) of a traction motor 11.

In normal operation mode the inner pinion shaft 31 is extended and the internal spline hub 33 is fully engaged with the drilling motor output shaft's mating external spline. The inner pinion shaft 31 is locked in this coupled position by the lock nut and washer 40. In case of a motor failure or break down requiring the rotor shaft of the failed traction motor to be physically isolated from the gearbox, the failed traction motor may be disengaged. The process is illustrated with reference to FIGS. 4-6. Dis-engagement may be done by: (1) unscrewing and removing 601 the cover 41 (see FIG. 4) to gain access to a pinion shaft assembly in the gear box 23; (2) unscrewing and removing 602 the lock nut and washer 40 from a retainer nut 38; (3) holding 603 the retainer nut 38 with a wrench and engaging the lower end of the threaded stud 37 with another wrench; (4) rotating 604 the threaded stud 37 until the top end with threads is fully engaged with a mating treaded bore in the end of an output shaft (not shown) of a traction motor 11; (5) when the threaded stud 37 is fully engaged with the motor output shaft, holding the threaded stud 37 and rotating 605 the retainer nut 38 so as to torque the retainer nut 38 to provide axial compression between inner pinion shaft 31 and motor shaft (not shown), whereby the force obtained may actuate, i.e., pull and slide 606 the inner pinion shaft 31 down until the spline connection of the internal spline hub 33 is fully separated (see FIG. 5); and (6) mounting 607 the lock nut and washer 40 to secure or lock the inner pinion shaft 31 in the decoupled position; and (7) reattaching 608 the cover 41 back onto the gearbox housing 23. Because dual lip seals 29 seal the inner pinion shaft 31 to the gearbox housing 23 in both the coupled and decoupled positions, the integrity of the gearbox lubrication system may be maintained during the coupling and decoupling processes. With the failed motor decoupled, the operator may shut down the VFD for the isolated motor and the drilling can continue with the second traction motor.

Figure 7:
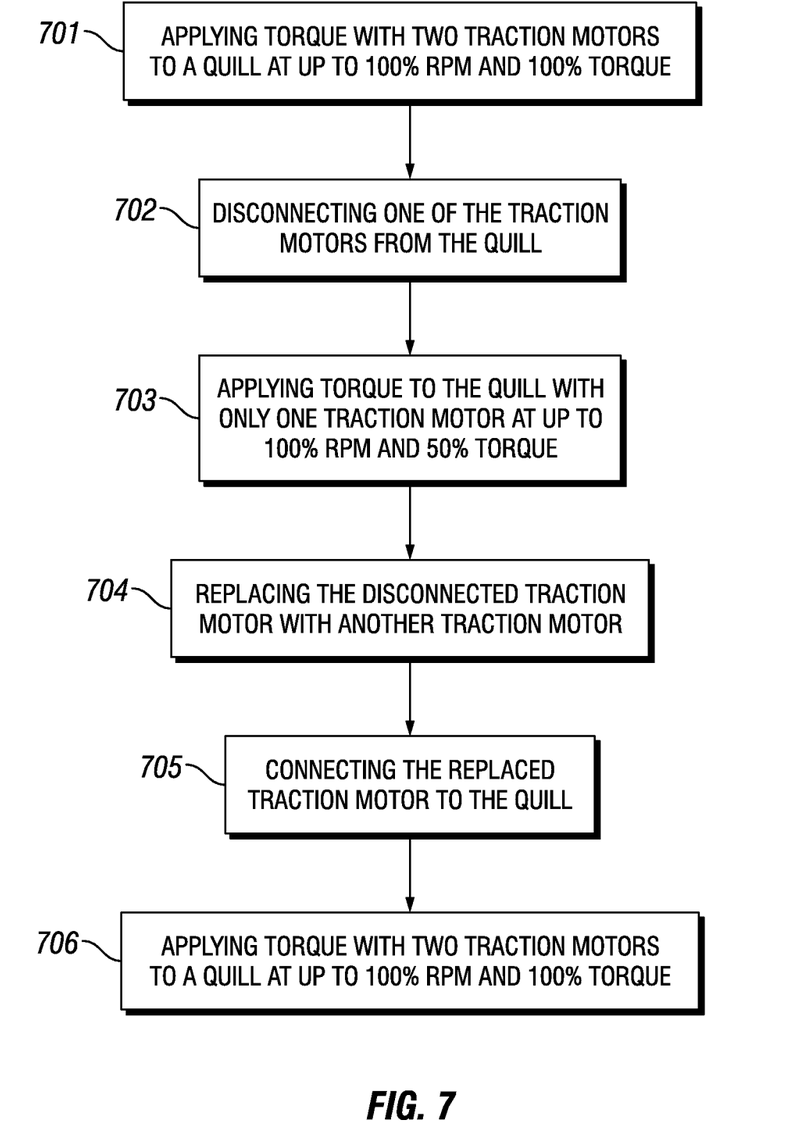
FIG. 7 is a flow chart illustrating a process for operating a top drive while a traction motor is being replaced.

A method of the present invention is illustrated with reference to FIG. 7. A top drive is operated by applying torque 701 with two traction motors to a quill through a gearbox of the top drive at up to 100% rpm and 100% torque. One of the traction motors is then disconnected 702 from the quill. The top drive is then operated by applying torque 703 with only the connected traction motor, wherein the quill may be drive by the connected traction motor at up to 100% rpm and 50% torque. The disconnected traction motor is then replaced 704 with a new traction motor. The new traction motor is connected 705 to the quill. The top drive is then operated by applying torque 706 with two traction motors connected to the quill, wherein the quill may be drive by the connected traction motors at up to 100% rpm and 100% torque.

One aspect of the invention is to provide a coupler/decoupler mechanism that is lubricated by the same lubrication system that lubricates the gears of the gearbox. As shown in FIG. 3, dual lip seals 29 and triple lip seals 28 seal the gearbox so that all of the mechanical components are housed in the same gearbox compartment. Bearings, gearwheels and the pinion shaft assemblies 30 may be partly submerged in the same gear oil reservoir 43 within the gearbox. The pinion shaft assemblies 30 may be reconfigured between coupled and decoupled configurations without interference with the gear oil in the gearbox. As the inner pinion shaft 31 moves between the coupled and decoupled positions, shown in FIGS. 4 and 5 respectively, dual lip seals 29 maintain a seal between the pinion shaft assemblies 30 and the gearbox housing 23. The pinion shaft assemblies 30 do not require a separate lubrication system. Thus, the pinion shaft assemblies 30 may be lubricated and reconfigured without disruption to the gearbox lubrication system.

In an alternative embodiment, the pinion shaft assembly may be automatically reconfigured to couple/decouple with the shaft of the traction motor. A control motor may be incorporated into the cover 41 so as to engage with the threaded stud 37. When the control motor is rotated in one direction to rotate the threaded stud 37, the inner pinion shaft 31 may be moved into a decouple position. When the control motor and threaded stud 37 are rotated in the opposite direction, the inner pinion shaft 31 may be moved into a couple position. The control motor may operate in response to control signals sent by a remote control system. In this embodiment, human hands are not required to physically manipulate the pinion shaft assembly.

Alternative embodiments of the invention are described with reference to FIG. 3. As described above, the pinion shaft assembly 30, the compound idle gear 48 and the quill driven gear 49 comprise a gear train between the traction motor 11 and the quill 22. In embodiments alternative to that illustrated in FIG. 3, the gear train may be coupled/decoupled at any link in the gear train. For example, rather than connecting/disconnecting the gear train at an interface between the pinion shaft assembly 30 and the motor shaft, the gear train may be connected/disconnected at the compound idle gear 48. The compound idle gear 48 may comprise an inner shaft and an outer shaft that slide longitudinally relative to each other to engage/disengage splines between them. In this embodiment, covers (similar to cover 41) may be positioned below each of the compound idle gears 48 to provide access for reconfiguring the compound idle gears 48. In alternative embodiments, the connecting/disconnecting of the gear train may be at an interface with the quill driven gear 49, an interface with the outer pinion shaft 32, splines between shafts of the compound idle gear 48, or any other interface in the gear train. In alternative embodiments, the gear train may comprise any number and size of gears, shafts, and/or linkages.

Although the disclosed embodiments are described in detail in the present disclosure, it should be understood that various changes, substitutions and alterations can be made to the embodiments without departing from their spirit and scope.

What is claimed is:

1. An assembly comprising:
   a gear train configured to be mechanically connected between a traction motor and a quill; and
   a pinion shaft assembly comprising:
      an internal spline hub that communicates torque from the traction motor when positioned to engage with the traction motor, and wherein the internal spline hub does not communicate torque through the gear train when positioned to disengage with the traction motor;
      an inner pinion shaft that is connected to the internal spline hub and configured to move both rotationally and axially therewith; and
   an outer pinion shaft positioned around the inner pinion shaft and engaging a gear of the gear train,
      wherein the inner pinion shaft is movable axially with respect to the outer pinion shaft from a coupled position in which the internal spline hub engages the traction motor and the inner pinion shaft transmits torque to the outer pinion shaft, and a decoupled position in which the inner pinion shaft does not transmit torque to the outer pinion shaft.

2. The assembly of claim 1, wherein the inner and outer pinion shafts engage with each other via splines when the inner pinion shaft is in the coupled position, and wherein the splines are disengaged when the inner pinion shaft moves to the decoupled position.

3. The assembly of claim 1, further comprising a lock that locks the inner pinion shaft in at least one of the coupled position and the decoupled position.

4. The assembly of claim 3, wherein the lock comprises a threaded lock nut fastened to a threaded stud.

5. The assembly of claim 1, further comprising an actuator configured to move the inner pinion shaft axially from the coupled position to the decoupled position.

6. The assembly of claim 5, wherein the actuator comprises a threaded stud and a retainer nut, wherein relative threading of the stud and nut moves the inner pinion shaft axially relative to the outer pinion shaft.

7. The assembly of claim 1, wherein the pinion shaft assembly further comprises:
   a threaded stud extending through the inner pinion shaft and configured to engage the traction motor; and
   a retaining nut received around and threaded to the threaded stud, the retaining nut bearing axially against the inner pinion shaft,
   wherein rotating the retaining nut relative to threaded stud moves the inner pinion shaft from the coupled position to the decoupled position.

8. The assembly of claim 1, further comprising:
   a gearbox, the gear train and the pinion shaft assembly being positioned at least partially in the gearbox; and
   a seal configured to seal the gearbox with the inner pinion shaft, such that the inner pinion shaft is movable axially between the coupled and decoupled positions without permitting lubrication fluid to exit from within the gearbox.

9. The assembly of claim 1, wherein the internal spline hub moves out of engagement with the traction motor by movement of the inner pinion shaft from the coupled position to the decoupled position.

10. A top drive for well operations, the top drive comprising:
    a gearbox;
    a traction motor in selective communication with the gearbox;
    a quill extending into the gearbox;
    a gear train in the gearbox and configured to transfer torque from the traction motor to the quill; and
    a pinion shaft assembly positioned at least partially in the gearbox for selective engagement with the traction motor to transfer torque to the quill, wherein torque is transferred from the traction motor to the quill through the pinion shaft assembly when the pinion shaft assembly is engaged with the traction motor, and wherein torque is not transferred from the traction motor to the quill through the pinion shaft assembly when the pinion shaft assembly is disengaged with the traction motor,
    wherein the pinion shaft assembly comprises:
       an internal spline hub that selectively engages the traction motor;
       an inner pinion shaft that is connected to the internal spline hub and configured to move axially and rotationally therewith; and
       an outer pinion shaft positioned around the inner pinion shaft and engaging a gear of the gear train, and
    wherein the inner pinion shaft is movable axially with respect to the outer pinion shaft from a coupled position in which the internal spline hub engages the traction motor and the inner pinion shaft transmits torque to the outer pinion shaft, and a decoupled position in which the inner pinion shaft does not transmit torque to the outer pinion shaft.

11. A top drive as claimed in claim 10, wherein the inner and outer pinion shafts engage with each other via splines when the inner pinion shaft is in the coupled position, and wherein the splines are disengaged when the inner pinion shaft moves to the decoupled position.

12. A top drive as claimed in claim 10, further comprising a threaded lock nut fastened to a threaded stud that locks the internal spline hub in at least one position selected from positions engaged with the traction motor and disengaged from the traction motor.

13. A top drive as claimed in claim 10, further comprising a threaded stud and a retainer nut, wherein relative threading of the stud and nut move the internal spline hub into and out of engagement with the traction motor.

14. A top drive as claimed in claim 10, further comprising a lubrication reservoir in the gearbox, wherein the quill and the pinion shaft assembly are at least partly lubricated by lubricant from the lubrication reservoir.

* * * * *